United States Patent [19]
Heffan et al.

[11] 3,766,387
[45] Oct. 16, 1973

[54] NONDESTRUCTIVE TEST DEVICE USING RADIATION TO DETECT FLAWS IN MATERIALS

[75] Inventors: Howard Heffan, Pleasant Hill; Emil M. Bergh, Walnut Creek; John W. Mauch, Danville; Walter J. Sawick, Napa, all of Calif.

[73] Assignee: The United States of America as represented by the Secretary of the Navy, Washington, D.C.

[22] Filed: July 11, 1972

[21] Appl. No.: 270,780

[52] U.S. Cl. ............................................ 250/83.3 D
[51] Int. Cl. .......................................... G01n 23/02
[58] Field of Search .............................. 250/83.3 D

[56] References Cited
UNITED STATES PATENTS

| | | | |
|---|---|---|---|
| 2,885,557 | 5/1959 | Kizaur | 250/83.3 D X |
| 2,800,590 | 7/1957 | Gilman | 250/83.3 D |

Primary Examiner—Archie R. Borchelt
Attorney—R. S. Sciascia et al.

[57] ABSTRACT

A nondestructive test device for detecting flaws such as boundary separation between the liner and propellant of missile motors and the like. The device includes a rotatable table upon which the motor to be tested is mounted. A horizontal movement carriage is mounted on a vertical movement carriage. Mounted upon the horizontal movement carriage is a radiation source and a detector. The source emits radiation that passes through the motor and is received by the detector. The motor is rotated and defects cause an increase in radiation received by the detector resulting in a deviation from the normal signal. This detected deviation is electronically processed and recorded. A radiation absorber, a rotating slotted helix for providing a radiation window, and a helix angulation control are employed to provide the necessary controls and desired information.

8 Claims, 6 Drawing Figures

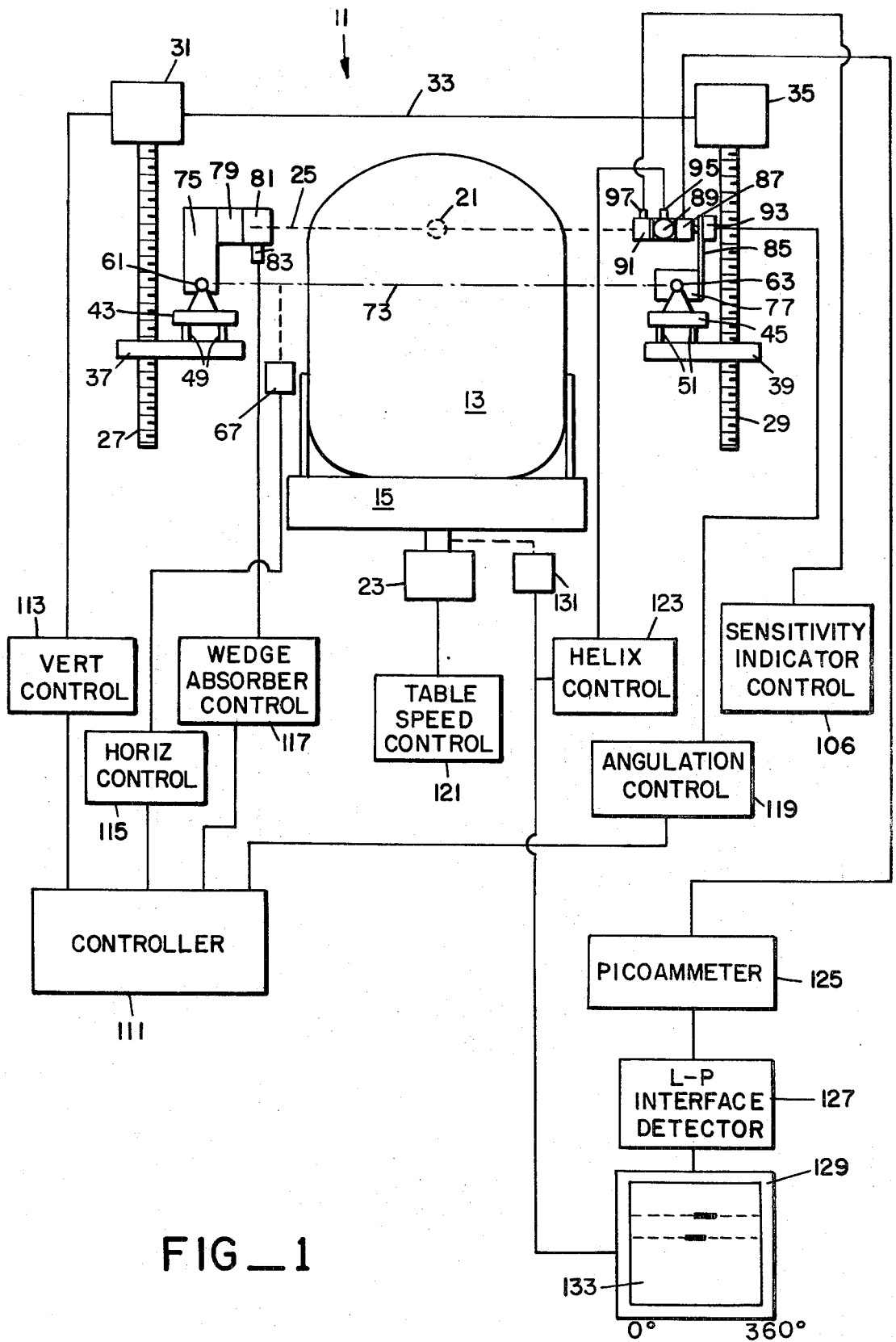
FIG_1

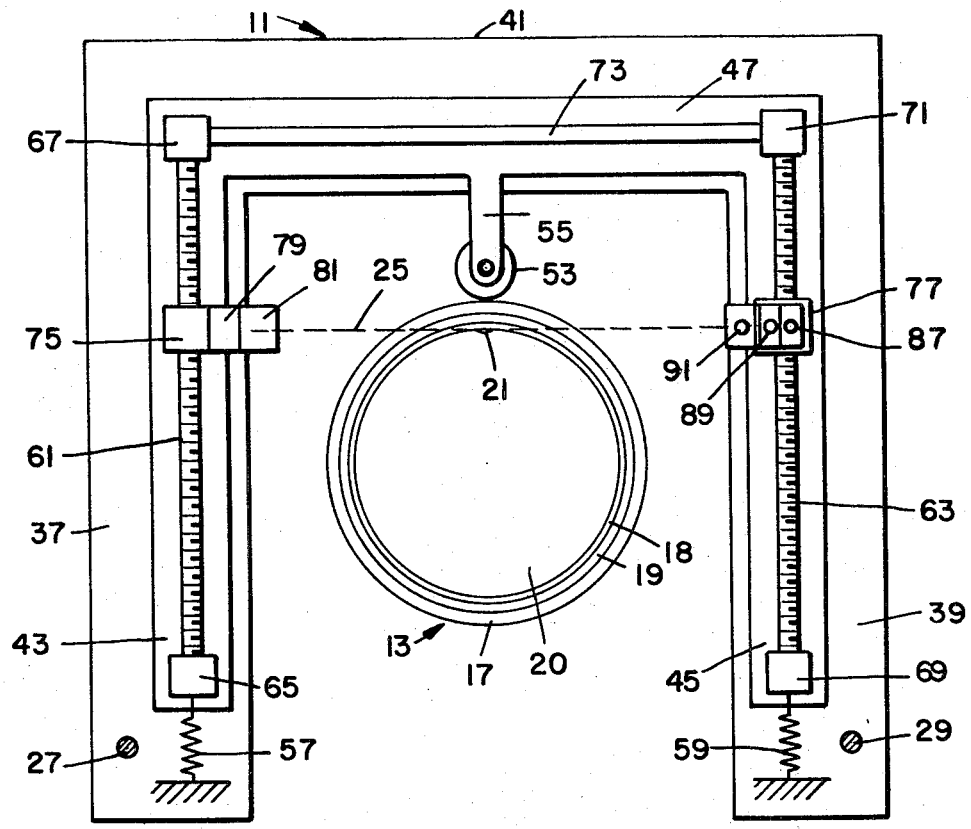
FIG_2
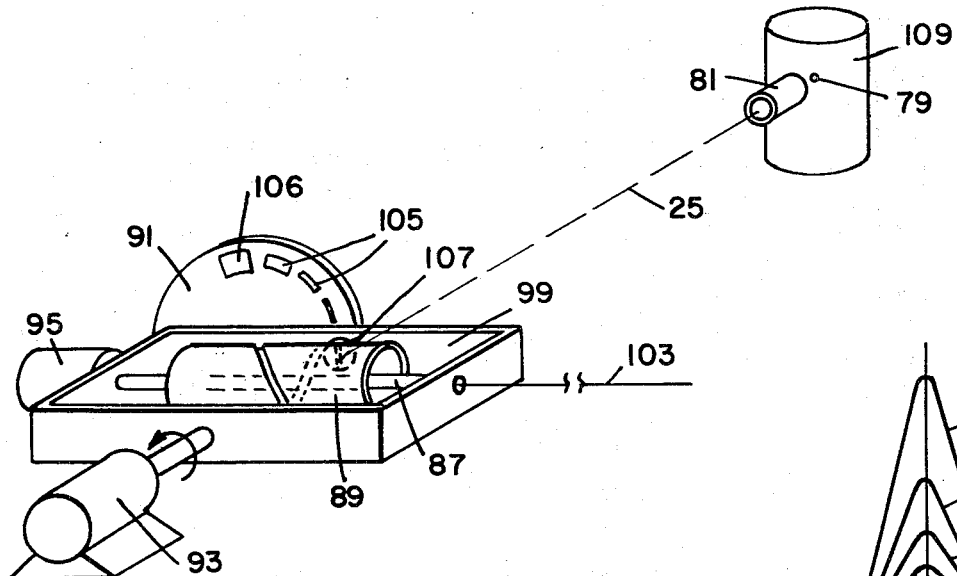
FIG_3
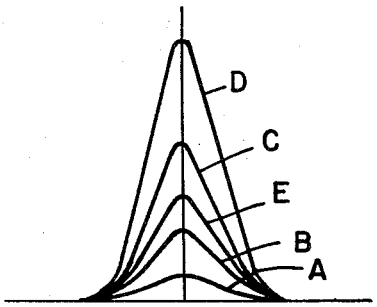
FIG_4

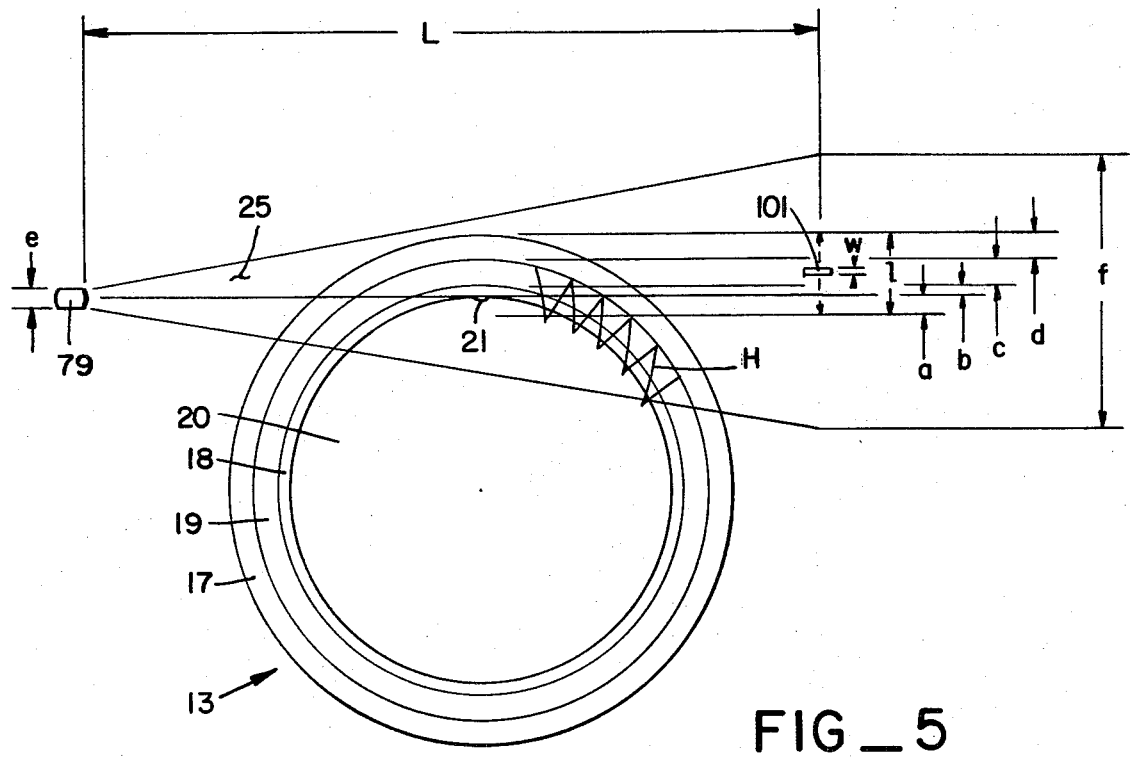
FIG_5
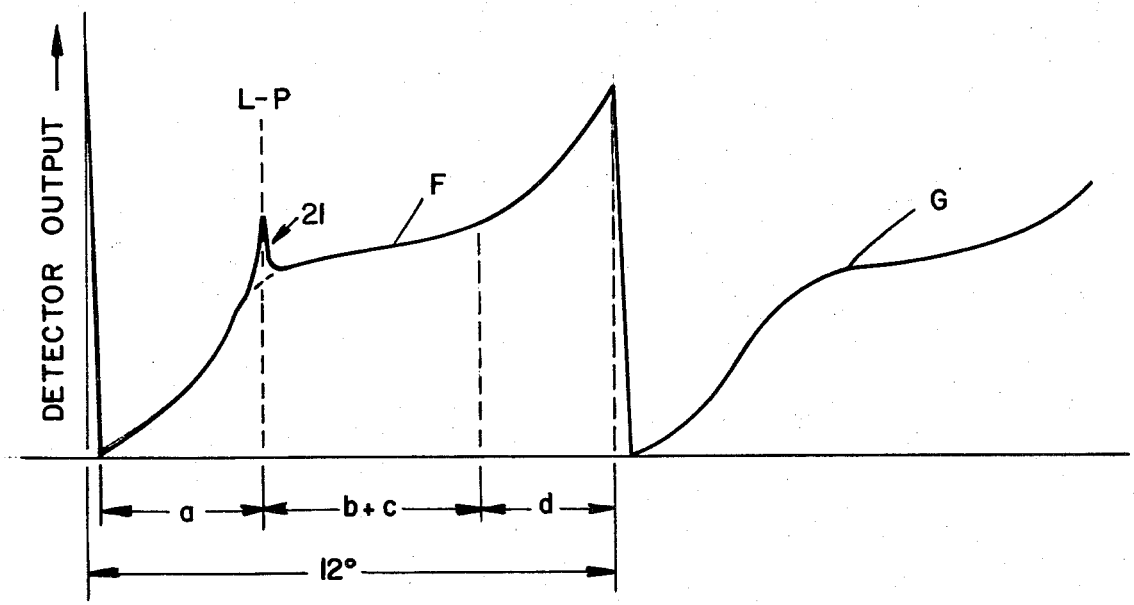
FIG_6

NONDESTRUCTIVE TEST DEVICE USING RADIATION TO DETECT FLAWS IN MATERIALS

BACKGROUND OF THE INVENTION

1. Field of the Invention

The present invention relates to a nondestructive test device and more particularly to a nondestructive test for detecting defects in rocket motors wherein the device detects gamma rays that pass through the motor to be tested.

2. Description of the Prior Art

Prior nondestructive test devices have generally consisted of the use of X-ray devices that record defects on film. This technique is very expensive because of the high cost of film and takes a substantial length of time to make the necessary tests.

SUMMARY OF THE INVENTION

The present invention relates to a nondestructive test device for detecting flaws, such as boundary separation between the liner and propellant of missile motors and the like. The device includes a rotatable table upon which the motor to be tested is mounted. A horizontal movement carriage is mounted on a vertical movement carriage. Mounted upon the horizontal movement carriage is a radiation source and a detector. The source emits radiation that passes through the motor and is received by the detector. The motor is rotated and defects cause an increase in radiation received by the detector resulting in a deviation from the normal signal. This detected deviation is electronically processed and recorded. A radiation absorber, a slotted helix for providing a radiation window, and a helix angulation control are employed to provide the necessary controls and desired information.

STATEMENTS OF THE OBJECTS OF INVENTION

An object of the present invention is to provide a nondestructive test device that is accurate and relatively inexpensive to operate.

Another object of the present invention is to provide a nondestructive test device that uses a radiation source and a radiation detector.

Still another object of the present invention is to provide a nondestructive test device for missile motors and the like that provide permanent test records without using film.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a schematic illustration of the controls and side elevation of the structural components of the nondestruct test system of the present invention;

FIG. 2 is a schematic illustration of the top elevation of the structural components of the system of FIG. 1;

FIG. 3 is a pictorial illustration of the detector, helix and sensitivity indicator of FIG. 1;

FIG. 4 is a group of curves illustrating the operation of the sensitivity indicator of FIGS. 1 and 3;

FIG. 5 is a top elevation of a cross section of a motor casing; and

FIG. 6 shows curves illustrating the output of the detector of the nondestructive test device of the present invention.

DESCRIPTION OF THE PREFERRED EMBODIMENTS

In FIGS. 1 and 2 is illustrated the radiation detector scanner system 11 of the present invention. FIG. 1 schematically illustrates the controls and the side elevation of the structural components of the system. FIG. 2 schematically illustrates the top elevation of the structural components of the system. The system may be used to detect flaws in a rocket motor 13, for example, which is mounted on table 15. As best illustrated in FIG. 2 and 5, the rocket motor includes a casing 17, a liner 18, insulation 19, and solid propellant 20. Frequently the rocket motor has a hemispherical dome, as illustrated in FIG. 1. The object of the detection system is to detect flaws, such as a void 21, that have formed between the liner 18 and propellant 20. This is achieved by rotating the rocket motor 13 on table 15 by means of table motor 23 and passing a radiation beam 25 through the interface between liner 18 and propellant 20, hereinafter referred to as the L-P interface. The beam scans this L-P interface from the top to the bottom of the motor at discrete steps. At each step the beam scans 360° around the casing, or one complete revolution of the table 15. It has been found that adjacent ½-inch steps are quite satisfactory for most purposes. This vertical motion is achieved by rotating vertical drive screws 27 and 29 by means of vertical drive stepping motor 31. Motor 31 directly drives screw 27 and remotely drives screw 29 through drive shaft 33 and 90° gear box 35. Vertical drive screws 27 and 29, respectively, engage vertical platforms 37 and 39 and cause them to raise or lower together. Vertical platforms 37 and 39 are rigidly interconnected by means of rear plate 41 shown in FIG. 2, thereby forming a U-shaped platform forming a common plane. Horizontal platforms 43 and 45 are rigidly interconnected by horizontal plate 47, shown in FIG. 2, thereby forming a U-shaped platform. Horizontal platforms 43 and 45 are respectively slidably mounted on vertical platforms 37 and 39 by means of slides or rollers 49 and 51, for example. The longitudinal position of horizontal platforms 43 and 45, with respect to vertical platforms 37 and 39, is determined by the position of motor follower 53 which is rotatedly mounted on one end of support 55, the other end of which is rigidly connected to horizontal plate 47. Horizontal platform 43 and 45 are respectively spring loaded by means of springs 57 and 59. One end of each of the springs is connected to its associated horizontal platform and the other end to the vertical platform. This spring loading arrangement causes motor follower 53 to be spring-biased against the exterior surface of the motor casing 17. During rotation of the motor, the motor follower follows the surface of the motor casing. Since the motor follower and the radiation beam source are mechanically interconnected, the radiation beam will always pass through the L-P interface even though the casing 17 is out of round. Horizontal drive screws 61 and 63 are respectively rotatably mounted on horizontal platforms 43 and 45. One end of screw 61 is supported by journal 65 and the other end is connected to horizontal drive stepping motor 67. One end of screw 63 is supported by journal 69 and the other end is connected to 90° gear box 71. Horizontal drive shaft 73 interconnects motor 67 and 90° gear box 71 so that horizontal traveling nuts 75 and 77 travel in the horizontal direction the same amount when driven by motor 67.

Mounted on horizontal traveling nut 75 is radiation source 79 and mounted on the face of radiation source 79 is radiation absorber 81. Different types and intensity of radiation sources may be employed; however, it has been found that a 2,000 curies cobalt 60 radiation source is satisfactory for most purposes. Radiation absorber 81 functions to absorb radiation emitted from source 79 to vary the intensity of radiation beam 25. Radiation absorber 81 may be of different types; however, it is preferably of the wedge type which is described in a co-pending patent application. The amount of radiation absorbed by radiation absorber 81 is determined by the degree of rotation of radiation absorber stepping motor 83.

Mounted on traveling nut 77 is support member 85. Rotatably mounted on support member 85 is detector 87, helix 89, and sensitivity indicator 91. The angular position of the detector, helix, and sensitivity indicator are determined by angulation stepping motor 93. The helix 89 is driven by helix stepping motor 95, and the sensitivity indicator is positioned by sensitivity indicator stepping motor 97. The relative position of the above described elements is schematically illustrated in FIG. 1 to depict function and not to illustrate their mechanical interrelationships. This mechanical interrelationship is illustrated in FIG. 3. In FIG. 3 the helix 89 is rotatably mounted on gimbol 99. Helix stepping motor 95 is mounted on gimbol 99 and rotates helix 89. Helix 89 is hollow and contains a helical slot 101 and a detector 87. The helical slot may be machined into a hollow thick-walled cylinder of high density material such as tungsten. The detector is stationary and is mounted on gimbol 99 and the output signal is transmitted by lead wire 103. The detector is preferably a photomultiplier tube having a sodium iodide crystal optically connected to the photomultiplier tube. Bearings, not shown in FIG. 3, are provided between detector 87 and helix 89 to provide rotatable support for the helix. The gimbol 99 is driven by angulation stepping motor 93. Sensitivity indicator 91 is a circular plate made of radiation absorbing material that is provided with a plurality of slots 105 of progressively increasing size. The sensitivity indicator is driven by a stepping motor 97, not shown in FIG. 3, such that one of the slots is positioned in alignment with opening 107. The radiation source 79 is mounted in enclosure 109. The beam 25 passes through radiation absorber 81, one of slots 105, opening 107, and impinges upon the surface of detector 87.

The window size of the detector, determined by the width and length of slot 101, is about 0.050 × 1 inch. The 0.050 is selected because it is large enough to receive sufficient photon flux to provide an acceptable signal to noise ratio and it is small enough to recognize separation defects of about 0.005 inch. That is, if the window were much wider than 0.050 inch, then the 0.005 defect would have little effect on the detector output signal. The length of 1.00 inch was selected because that is about the diameter of defect necessary to be detected and is sufficiently long to provide an adequate inspection time. That is, with a 1-inch length of detector window, ½-inch vertical steps may be taken without overlap or gaps. This is because there is an about 2 to 1 beamspread and the L-P point is about halfway between the source and detector.

The sensitivity indicator 91 is used for purposes of calibration. The system is placed into operation in a position on the motor where the motor has no defects. The sensitivity indicator has four, for example, discrete positions or slots 105. The particular position is selected by sensitivity indicator control 106. The sensitivity indicator is initially placed in the first position which allows only a limited amount of radiation through helix 89. When the helical slot rotates to the position that allows radiation to enter the detector 87, the detector will provide a small output signal indicated in FIG. 4 by reference numeral A. The width of the signals shown in FIG. 4 are determined by the width of the helical slot. Then the sensitivity indicator is successively positioned in the second, third and fourth calibration positions, which progressively allow more radiation through the helix by increasing the amount of nonradiation absorbing area, or stated differently, decreasing the amount of radiation absorbing area. This calibration sequence results in detector output signals, illustrated by curves B, C and D in FIG. 4. After calibration, the sensitivity indicator is taken out of system operation by positioning large slot 106 adjacent opening 107 of FIG. 3. This opening is sufficiently large so that it does not interfere with the amount of radiation permitted to pass through the helix to the detecotr. The calibration curve of FIG. 4 is then used to denote the size of the defect or the amount or degree of separation in the motor when the motor is being examined or tested as hereinafter explained. That is, if the output of the detector during test provides an output signal, indicated by curve E of FIG. 4, then the degree of separation can be determined by comparing this signal to the known calibration standards which were previously determined by experimentation. It should be noted that the effective detector window height may be adjusted by the height of slit 106. Normally, the height will be selected from the range of from about zero to about 2 inches.

An alternative embodiment of the sensitivity indicator employs a circular plate made of nonradiation absorbing material, such as thin aluminum and having mounted thereon either blocks of radiation absorbing material or wires of radiation absorbing material. The blocks of radiation absorbing material have different sized slots therein to correspond with slots 105 of FIG. 3. When using blocks with slots formed therein, the resulting curves will be the same as shown in FIG. 4. When using wires of progressively increasing size, fastened by gluing, or the like, to the surface of the thin aluminum plate, then the curves will be the inverse of those shown in FIG. 4. The overall result of any one of these techniques is a low precise L-P interface separation simulator. Previous techniques have required the use of actual motors having known separations at known locations.

In FIGS. 5 is illustrated the motor and various dimension considerations. The source 79 has an emission diameter $e$ of about ½-inch and spreads to a diameter $f$ of about 12 inches after a length of travel L of about 120 inches. From this it can be seen that radiation will be passing through all of the critical regions of the motor where measurements are to be made. That is, the scan length "l" of about 1½ inches is adequate for most purposes. However, it is to be understood that it may be varied depending upon the particular use and needs. The rotational speed of the motor 13 and the rotational speed of the helix 89 are selected such that the helix rotates 360° when the motor rotates 12°. The detector output is illustrated in FIG. 6 for 12° of motor rotation and 360° helix rotation. The distances a, b, c, and d of FIG. 6 correspond with the distances a, b, c, and d of FIG. 5. In FIG. 6, curve F represents the detector output when a defect is present and curve G when a defect is not present. From this, it can be seen that minimum detector output is attained when traversing distance a because more motor material is absorbing radiation. When a defect 21 is traversed, then the detector output has an increase because radiation absorption material is not present in the defect which is a void filled with air or a gas. The detector output at the defect location is indicated by reference numeral 21 in FIG. 6. The detector curve flattens out in region $b + c$ because the liner and insulation absorb a lesser amount of radiation than the propellant casing. Region d represents the absorption by the casing. From this, it can be seen that a measurement of the L-P interface will be made each 12° of rotation of the motor 13. Therefore, 30 L-P interface measurements will be made at each horizontal position around the motor casing. This is illustrated in FIG. 5 by curves H which designate the continuous line of motor measurement.

The operation of the system will now be described with reference to the various drawings and with particular reference to FIG. 1. The operation of the overall system is controlled by means of controller 111. Controller 111 is a tape processor which provides output pulses as dictated by the particular tape that is being used. The tapes are prepared in advance for each particular motor being tested. That is, the vertical control may be upward movement of vertical platforms 37 and 39 by ½ or 1-inch movements depending upon the motor; horizontal movement of horizontal traveling nuts 75 and 77 will be made in the dome region, if the motor has a hemispherical dome, but will stay constant in cylindrical regions. The absorber 81 will be varied if there are measurements in the hemispherical dome, but normally not in cylindrical regions of the motor. The angulation motor 93 will be driven only in the hemispherical dome region of the motor. These parameters and their magnitudes will vary depending upon the particular motor under test. The method of preparing the tapes and the use of the tapes are considered conventional and well known to those skilled in the art and are not considered part of the present invention.

Controller 111 has four outputs which are respectively applied to the inputs of vertical control 113, horizontal control 115, wedge absorber control 117, and angulation control 119. The output of vertical control 113 is connected to the input of vertical drive stepping motor 31. The output of horizontal control 115 is connected to the input of horizontal drive stepping motor 67. The output of wedge absorber control 117 is connected to the input of radiation absorber stepping motor 83. The output of angulation control 119 is connected to the input of angulation stepping motor 93. The output of controller 111 is a digital signal that is applied to the input of the various controls. The output of the controls 113, 115, 117, and 119 are a plurality of pulses the number of which depend upon the digital instructions from controller 111. Typical examples of operation are as follows: To raise vertical platform ½-inch, after making one revolution of measurements, vertical control 113 will provide 5,000 pulses, for example, to drive vertical drive stepping motor 31. If operating in the hemispherical dome region of a motor, it will be necessary to move horizontal traveling nuts 75 and 77 toward the center line of the motor after making one revolution of measurements. It should be noted that traveling nut 75 carries radiation source 79 and absorber 81 and traveling nut 77 carries detector 87, helix 89 and sensitivity indicator 91. Since it is necessary that the center of the radiation beam 25 pass near the L-P interface, the source and detector are moved a step toward the motor centerline for each step the source and detector are moved upward. For example, at the 45 angle of the dome, if the source and detector are moved ½ inch upward by vertical platforms 37 and 39, then the source and detector must also be moved about ½ inch inward by vertical nuts 75 and 77. The ½ inch horizontal movement may be made by having horizontal control apply 500 pulses, for example, to horizontal drive stepping motor 67. At other angles the relative movements will be correspondingly different. The radiation absorber 81 is used to maintain the output voltage range of the detector 87 at a nearly constant value regardless of the position of measurement on the motor. That is, since the casing, insulation, and liner of the motor are thicker in the dome region than in the cylindrical region, the motor will absorb more radiation in the dome region thereby causing the detector output to have a smaller range in the dome region. It is highly desirable to correct the system so that the output range of the detector remains the same regardless of the region of the motor being tested. To achieve this uniform voltage range, minimum absorption by absorber 81 is used in the dome region and substantial absorption is used in the cylindrical region. In this manner the shape and size of the curves, shown in FIG. 6, will remain about the same regardless of where the measurements are being made on the motor. As a general rule, absorber control 117 will provide no output signal between discrete upward steps of measurements in the cylindrical region of the motor. However, the absorber control will normally provide output pulses during the transition from the cylindrical region to the dome region. Also, depending upon the particular motor, there may be several changes in the absorber when measuring the dome at different positions. The amount of absorption is predetermined and is programmed into the tape used in controller 111.

In addition to the foregoing, it is necessary to maintain the longitudinal axis of the helix 89 perpendicular to the tangent of the exterior surface of the casing of the motor. This is necessary so that the defect will always appear as being parallel to the long axis (1-inch) of the detector window. If this were not done, many small defects would be missed because they would not appear as sufficiently strong signals on the detector output. Angulation control will provide no output signals while measurements are being taken in the cylindrical region. However, rotation of the helix about an axis perpendicular to its rotational axis, must be made between each measurement step in the dome region. Referring to FIG. 3, assume the gimbol 99 is in the position shown during the last measurement in the cylindrical region. Prior to the first measurement in the dome region, stepping motor 93 must rotate gimbol 99 a small amount counterclockwise so that the longitudinal axis of the helix will be perpendicular to the tangent of the exterior surface of the casing of the motor. This step by step rotation of the gimbol will continue as the measurements of the dome continue upwards. The position of angulation stepping motor 93 is determined by the number of pulses provided at the output of angulation control 119 which is determined by the taped program and the particular configuration of the motor being tested.

The speed of rotation of table 15 is determined by table speed control 121 which is normally set to be one revolution per minute. The speed of rotation of helix 89 is determined by helix control 123 which is normally set to be 30 revolutions per minute.

The output of the detector 89 is applied to picoammeter 125 the output of which is applied to the input of an L-P interface detector circuit 127. The interface detector circuit detects the error signal 21 of curve F of FIG. 6. Different sensing circuits may be used for this purpose; however, a particularly useful circuit for achieving this is shown and described in a co-pending patent application. The output of the L-P interface detector 127 is applied to the input of C-scan recorder 129. The output of pulse generator 131, which denotes the rotational position of table 15, is applied to the input of C-scan recorder 129.

In this way, the output of the L-P interface detector 127 is synchronized with the rotation of table 15 and therefore the exact location of the defect is specified on the recording chart 133 of the C-scan recorder, as illustrated. From this, it can be seen that an accurate and permanent record of the motor defects are made.

It is to be understood that the present invention is not limited to measuring defects of motors. But rather, it may be used to measure any deviation of transmitted radiation.

What is claimed is:

1. A nondestructive testing device for testing a member for defects comprising:
   a. first means for mounting said member;
   b. a radiation source;
   c. a detector;
   d. said radiation source emitting radiation for passing through said member;
   e. said detector positioned for receiving radiation passing through said member;
   f. contour following means for moving said radiation source and detector such that the radiation source and detector about follow the contour of said member;
   g. second means for moving said radiation source and detector in the vertical direction; and
   h. third means for moving said radiation source and said detector in the horizontal direction.

2. The device of claim 1 including:
   a. fourth means operatively connected to said radiation source for selectively absorbing discrete amounts of radiation output of said radiation source.

3. The device of claim 1 including:
   a. fifth means operatively connected to said detector for selectively absorbing discrete amounts of the radiation input to said detector.

4. The device of claim 1 including:
   a. sixth means for controlling said second means to move vertically in discrete steps and for controlling said third means to move horizontally in discrete steps.

5. The device of claim 2 wherein:
   a. said first means is a rotatable table;
   b. said second means comprises a first platform and means for moving said first platform in the vertical direction;
   c. said third means comprising a second platform and means for moving said second platform in the horizontal direction; and
   d. said second platform being slidably mounted on said first platform.

6. The device of claim 5 including:
   a. a follower operatively connected to said second platform for following the contour of said member; and
   b. bias means operatively connected to said first and second platforms for biasing said follower against said member.

7. The device of claim 5 wherein:
   a. said fourth means is a radiation absorbing device that introduces a wedge into the radiation beam; and
   b. said fifth means comprises a rotatable plate having a plurality of progressively changing radiation absorbing means that are selectively positioned in front of said detector.

8. The device of claim 1 wherein:
   a. said detector comprises a cylinder having a helical slot formed therein;
   b. a radiation detector device positioned within said cylinder;
   c. means for rotating said cylinder about its longitudinal axis; and
   d. means for rotating said radiation detector and cylinder about an axis perpendicular to said longitudinal axis.

* * * * *